United States Patent
Madhavan et al.

(10) Patent No.: US 9,208,797 B2
(45) Date of Patent: Dec. 8, 2015

(54) TONE DETECTION FOR SIGNALS SENT THROUGH A VOCODER

(75) Inventors: Sethu K. Madhavan, Canton, MI (US); Jijun Yin, San Diego, CA (US); Qin Jiang, Woodland Hills, CA (US); Darrel James Van Buer, Los Angeles, CA (US)

(73) Assignee: General Motors LLC, Detroit, MI (US)

( * ) Notice: Subject to any disclaimer, the term of this patent is extended or adjusted under 35 U.S.C. 154(b) by 2179 days.

(21) Appl. No.: 12/106,261

(22) Filed: Apr. 18, 2008

(65) Prior Publication Data

US 2009/0265173 A1 Oct. 22, 2009

(51) Int. Cl.
*G10L 25/78* (2013.01)
*H04Q 1/46* (2006.01)

(52) U.S. Cl.
CPC . *G10L 25/78* (2013.01); *H04Q 1/46* (2013.01)

(58) Field of Classification Search
CPC .................................. H04Q 1/46; G10L 25/78
USPC ...................... 379/31, 283, 386; 704/500–503
See application file for complete search history.

(56) References Cited

U.S. PATENT DOCUMENTS

| 5,333,191 | A | * | 7/1994 | McCarthy | 379/386 |
|---|---|---|---|---|---|
| 5,408,529 | A | * | 4/1995 | Greaves | 379/386 |
| 5,619,564 | A | * | 4/1997 | Canniff et al. | 379/386 |
| 5,910,906 | A | * | 6/1999 | Schmitt | 708/312 |
| 6,128,370 | A | * | 10/2000 | Barazesh et al. | 379/31 |
| 6,587,559 | B1 | * | 7/2003 | Bartkowiak | 379/386 |
| 6,732,058 | B2 | * | 5/2004 | Jin et al. | 702/77 |
| 6,782,095 | B1 | * | 8/2004 | Leong et al. | 379/386 |
| 7,133,521 | B2 | * | 11/2006 | Jabri et al. | 379/386 |
| 2001/0036260 | A1 | * | 11/2001 | Schulz | 379/390.02 |
| 2002/0018555 | A1 | * | 2/2002 | Charbin-Pramayon | 379/346 |
| 2003/0156709 | A1 | * | 8/2003 | Lee et al. | 379/372 |
| 2004/0158466 | A1 | * | 8/2004 | Miranda | 704/236 |
| 2005/0105716 | A1 | * | 5/2005 | Das et al. | 379/376.02 |

* cited by examiner

*Primary Examiner* — Jialong He
(74) *Attorney, Agent, or Firm* — Anthony Luke Simon Reising Ethington P.C.

(57) ABSTRACT

A tone detector and associated method for use with EVRC-B and GSM vocoders to enable reliable detection of system connect tones over a wireless communication system. The tone detection method examines a number of sequential data frames of the signal received from the vocoder and determines that the tone is present if the spectral energy at frequencies around the tone is much higher than that at neighboring frequencies and if the calculated center frequency of the data frames is at or near the frequency of the tone.

20 Claims, 3 Drawing Sheets

TONE DETECTION FOR SIGNALS SENT THROUGH A VOCODER

TECHNICAL FIELD

The present invention relates generally to tone detection and, more specifically, to detection of a predetermined tone received from a vocoder at a wireless terminal device.

BACKGROUND OF THE INVENTION

Most cellular communication in use in the world today utilize either the GSM (including UMTS) or CDMA (IS-95 or CDMA2000) communication systems. These systems transmit speech over a voice traffic channel using a modulated carrier wave. For example, 2G GSM uses GMSK modulation and IS-95 CDMA uses PSK modulation. Prior to modulating the speech for wireless transmission, the voice input is run through a speech compression circuit such as a vocoder to compress the voice input into a smaller amount of data. This reduces the amount of speech data that needs to be transmitted via the wireless network, thereby permitting the use of a smaller bit rate and a greater number of users sharing the same communication system.

Transmission of non-speech data via the voice channel is also possible and techniques for doing so are known. These techniques typically use a modem at each end with a predefined connect tone or series of tones being used to alert the receiving modem of a requested data transmission. The various attributes of the data connection can then be negotiated by the two modems. To implement this approach, a tone detector is used to recognize the tone from the received signal. However, the ability of the tone detector to recognize the tone is impacted by the vocoder used, as different speech compression techniques have different effects on the tone as it passed through the vocoder.

The speech codecs used by different vocoders commonly use various forms of linear predictive codings (LPC); for example, 2G GSM uses a RPE-LPC speech codec, while IS-95 CDMA uses a variable rate CELP codec. These predictive compression techniques are designed specifically for voice encoding and, as such, are designed to filter out noise and other non-speech components. As a result, the transmission of connect tones and digital data (such as ASCII text, byte codes, binary files) can be problematic since the vocoder processing can corrupt the tones and digital data, making them unrecoverable at the receiving end of the transmission.

SUMMARY OF THE INVENTION

According to an aspect of the invention, there is provided a method for detecting a tone in a signal received from a vocoder. The method includes the steps of performing a spectral energy analysis on the signal, determining a center frequency for the signal, and determining that tone is present if a result of the spectral energy analysis meets at least one selected criterion and if the center frequency is within a selected range of frequencies that includes a primary frequency of the tone.

In accordance with another aspect of the invention, there is provided a method for detecting a tone in a signal received from a vocoder, comprising the steps of:

(a) carrying out the following steps (a1) through (a3) for each of plurality of different portions of the signal:

(a1) determining an energy characteristic of a portion of the signal at each of a first plurality of selected frequencies that together comprise a first group of frequencies;

(a2) determining an energy characteristic of the portion of the signal at each of a second plurality of selected frequencies that together comprise a second group of frequencies;

(a3) determining a relationship between a combination of the energy characteristics for the first group of frequencies and a combination of the energy characteristics for the second group of frequencies; and (b) determining a center frequency for the first group of frequencies; and (c) determining that the tone is present in the signal if the relationship meets at least one selected criterion and if the center frequency is within a selected range of frequencies that includes a primary frequency of the tone.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
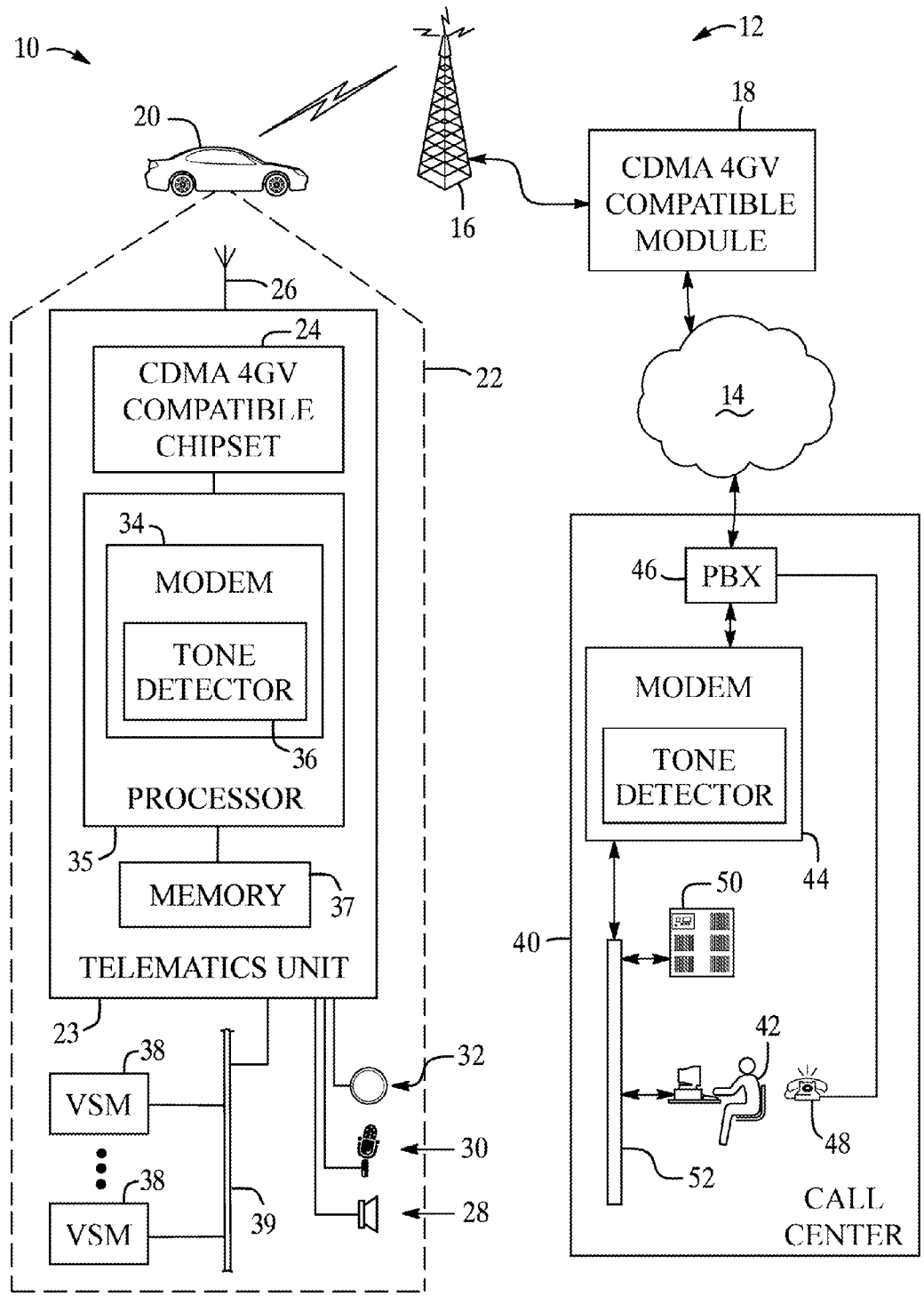
FIG. 1 is a block diagram of a wireless communication system that uses a tone detector in establishing data connections via the wireless communication system.

Referring to FIG. 1, there is shown an electronic communication system 10 constructed in accordance with the invention. The communication system 10 includes a conventional cellular communication network having a voice traffic channel that is used for two-way transmission of voice data between cellular telephones. The communication system 10 also includes the ability to utilize the cellular system voice channel to exchange digital data containing information other than speech or other audio. As will be discussed in greater detail below, this data communication is carried out at least in part using modems that include a tone detector used by the modems in establishing data connections with each other. The tone detectors are configured to recognize predefined system connect tones transmitted by the other modem via the cellular network, and this can be successfully accomplished notwithstanding the fact that the tones are sent via a vocoder used by the communication system.

The communication system 10 includes in general a cellular communication network 12 connected to a land telephony network 14 which together are used to provide voice and data communication between a passenger vehicle 20 and a call center 40. Vehicle 20 has an onboard electronics system, a portion of which is shown at 22. Electronics system 22 has a telematics unit 23 that includes the components normally found in a cellular communication device, such as a CDMA compatible chipset 24 and antenna 26 that enables use of the cellular network 12 to permit a vehicle occupant to carry on voice conversations using a speaker 28 and microphone 30. These components of telematics unit 23 can be implemented in a conventional manner, as will be known to those skilled in the art. Apart from the microphone 30 input, onboard system 22 also includes at least one pushbutton 32 that can be used to initiate a voice communication with a live advisor 42 located at the call center 40.

In accordance with 4G CDMA systems, voice data from both the vehicle occupant (not shown) and the live advisor 42 are encoded using a vocoder to compress the speech prior to wireless transmission over the voice traffic channel via the cell tower 16. Once received over the wireless network, the encoded speech is then decoded by the vocoder for the listener. The vocoder is incorporated into the chipset 24 as well as in a CDMA compatible module 18 located in the base equipment at the cell tower 16. Although various compression codecs can be used, in the illustrated embodiment, the 4G vocoder is implemented as a time-varying, non-linear filter. Various such codecs are well known using linear predictive techniques; for example, a RPE-LPC codec or a fixed or variable rate CELP codec. In the specific embodiment illustrated in FIG. 1, the 4G vocoder can be a Qualcomm™ 4G Vocoder that is a CDMA2000 device and that uses the 3gpp2 standards-based EVRC-B codec. However, it will be appreciated that any suitable vocoder and codec (whether linear predictive or not) can be used instead.

In addition to the typical voice data transmission over the voice traffic channel, the communication system 10 enables data communication via this same voice traffic channel and through the vocoder 18, 24. This is accomplished using a modem on either side of the vocoder; that is, using a first modem 34 incorporated into the onboard vehicle communication system 22 and a second modem 44 located at the call center 40. These modems can have the same construction and operation so that only modem 34 will be described, and it will be appreciated that the description of modem 34 applies equally to modem 44. As shown in FIG. 1, the telematics unit 23 can switch or multiplex the CDMA 4GV chipset 24 between the modem 34 and the telephony devices 28-32 so that the cellular communication network 12 can be used for either voice or data communication, or both, even during the same call.

Regardless of whether the cellular call is initiated at the vehicle 20 or call center 40, the transmitting modem can use a predefined tone or series of tones to alert the receiving modem of the requested data transmission, and the various attributes of the data connection can then be negotiated by the two modems. Different tones can be used in each direction so that, for example, the call center modem might transmit a 2225 Hz tone to the vehicle whereas the vehicle modem transmits an 850 Hz tone back. This connect tone is detected at each modem by a tone detector 36 configured for the particular system connect tone expected. Once the connect tones are exchanged and the data connection established, the modem then uses a suitable modulation technique to transmit the data between the telematics unit 23 and call center 40. Various known modulation techniques can be used, such as are disclosed in U.S. Patent Application Publication Nos. 2007-0092024 A1 and 2007-0258398 A1, the entire contents of which are hereby incorporated by reference.

In general, the connect tone being detected at each modem has at least one primary frequency, meaning that the tone can be a composite of different frequencies, one or more of which are considered a primary or dominant frequency, or can be a single frequency in which case the primary frequency is simply that single frequency. The exemplary embodiment discussed below is based on a single frequency connect tone of 2225 Hz, which can be sent as a continuous tone or can be sent as a series periodic tones such as by sending three second periods of the 2225 Hz tone with each three second period being separated by 240 msec of silence. Again, depending upon the particular vocoder used, other single or multiple frequency connect tones can be utilized, either with or without intermittent periods of silence.

As illustrated in FIG. 1, modem 34 and its tone detector 36 can be implemented using software running on the telematics microprocessor 35. This software can be stored in the telematics memory 37. Other alternative implementations will be apparent to those skilled in the art; for example, the modem 34 could be incorporated into the 4GV chipset 24, or can be implemented using a dedicated IC or other hardware component, or the modem software could be stored on processor 35 itself or on other memory not shown.

On the vehicle 20, the digital data being encoded and sent via modem 34 can be obtained by the telematics unit 23 from one or more vehicle system modules (VSMs) 38 over a vehicle network 39. These modules 38 can be any vehicle system for which information transmission is desired to or from the call center 40 or other remote device or computer system. For example, one VSM 38 can be a diagnostic system that provides diagnostic trouble codes or other diagnostic information to the call center 40. As another example, VSM 38 can be a GPS-enabled navigation system that uploads coordinates or other such information concerning the vehicle's location to the call center. Data can be transmitted from the call center (or other remote device or computer system) to the vehicle as well. For example, where VSM 38 is a navigation system, new maps or other directional or point of interest information can be downloaded to the vehicle. As another example, a VSM 38 can be an infotainment system in which new music or videos can be downloaded and stored for later playback. Furthermore, the term "digital data" as used herein includes not only information, but also executable code such that new programming can be downloaded to the vehicle via the voice traffic channel from a server or other computer. Those skilled in the art will know of other such VSMs 38 and other types of digital data for which communication to and/or from the vehicle 20 is desired.

The vehicle network 39 can be implemented as any suitable network, such as a controller area network (CAN), a media oriented system transfer (MOST), a local interconnection network (LIN), an Ethernet, a local area network (LAN), and can utilize appropriate connections and protocols such as those that conform with known ISO, SAE and IEEE standards and specifications. A separate infotainment network (not shown) can also be included for access by the telematics unit 23 to a vehicle radio system, in which case the speaker 28 could be eliminated and instead the vehicle radio system speaker(s) used for audio output during voice conversations through the communications system 12.

Land network 14 can be a conventional land-based telecommunications network that is connected to one or more landline telephones and connects wireless carrier network 12 to call center 40. For example, land network 14 can include a public switched telephone network (PSTN) and/or an Internet Protocol (IP) network, as is appreciated by those skilled in the art. Of course, one or more segments of land network 14 could be implemented through the use of a standard wired network, a fiber or other optical network, a cable network, power lines, other wireless networks such as wireless local area networks (WLANs) or networks providing broadband wireless access (BWA), or any combination thereof. Furthermore, call center 40 need not be connected via land network 14, but could include wireless telephony equipment so that it can communicate directly with wireless network 12.

Call center 40 includes not only the live advisor 42 and modem 44, but also several other components. It includes a PBX switch 46 to route incoming calls either to one or more telephones 48 for voice communication or to modem 44 for data transmission. The modem 44 itself can be connected to various devices such as a server 50 that provides information services and data storage, as well as a computer used by the live advisor 42. These devices can either be connected to the modem 44 via a network 52 or alternatively, can be connected to a specific computer on which the modem 44 is located. The various components of FIG. 1 include some that are conventional and others that can be implemented based upon the description contained herein and the knowledge possessed by one skilled in the art. For example, although the modems 34, 44 and their tone detectors are not conventional components, techniques for implementing them are known and can be implemented by those skilled in the art using such components as DSPs and ASICs. Similarly, the other features needed to implement the modems 34, 44 are all well known to those skilled in the art.

Figure 2:
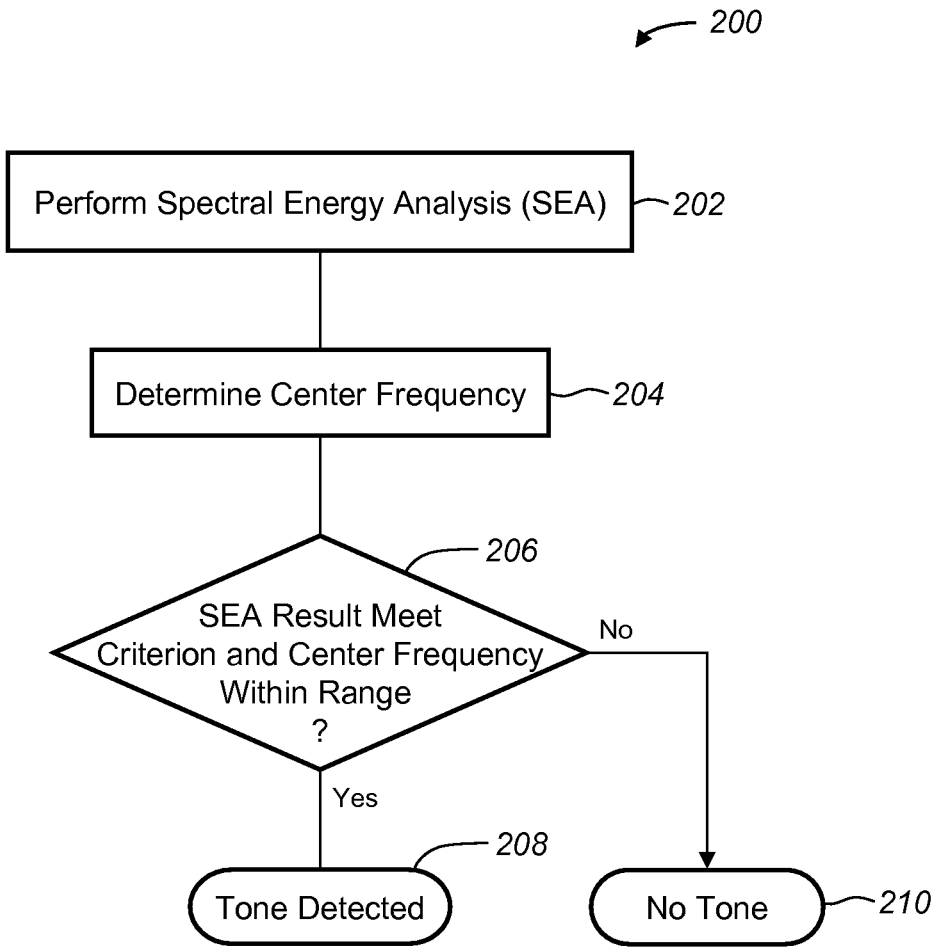
FIG. 2 is a flow chart depicting a first exemplary tone detection method that can be used by the tone detector of FIG. 1.
Figure 3:
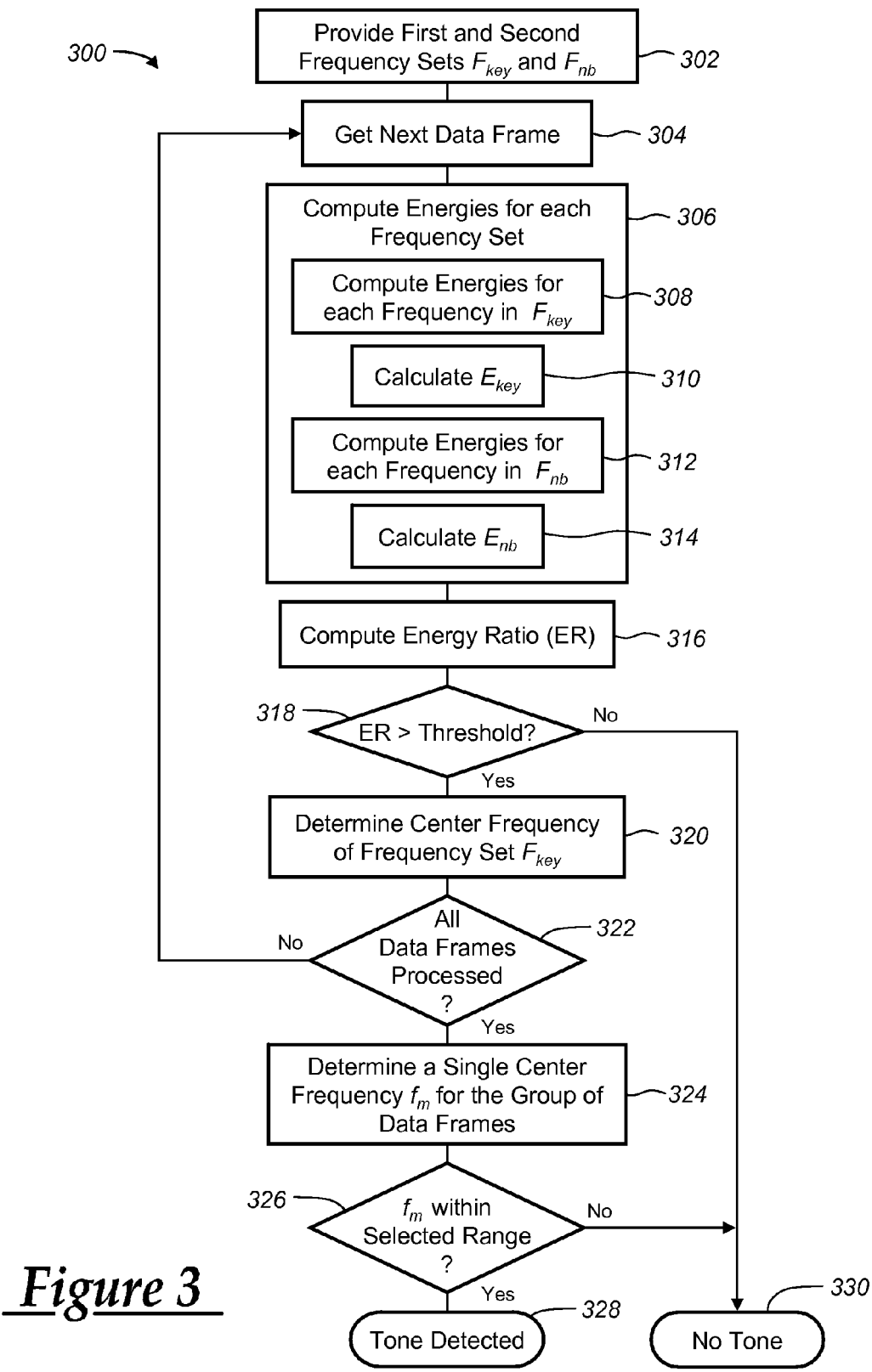
FIG. 3 is a flow chart depicting a second exemplary tone detection method that can be used by the tone detector of FIG. 1.

Turning now to FIG. 2, there is shown a method 200 for detecting the tone in the signal received at the modem 34 from the vocoder. The method 200, as well as that of FIG. 3, is carried out by tone detector 36 and is particularly suited for use with EVRC-B and GSM vocoders, although they can be used with others as well. In general, the method uses spectral energy analysis in combination with a center frequency determination to decide if the signal received contains the tone being detected. The method begins at step 202 where the spectral energy analysis (SEA) is performed. This can be done in various ways, preferably to determine the relative amount of energy at or near the tone's primary frequency(ies) versus that at other frequencies above and/or below the primary frequency(ies). One such approach is described below in connection with FIG. 3. The next step 204 involves determining a center frequency for the signal, and this can be done to obtain an estimate of the frequency at which most of the energy in the signal exists. Again, FIG. 3 below provides a specific exemplary approach for this. Finally, at step 206, the result of the spectral energy analysis is compared to at least one criterion and the center frequency is examined to determine if it is within a selected range of frequencies that include at least one primary frequency of the tone. If both conditions are met, then the tone is determined to be present, as indicated at block 208. If either of these conditions are not met, then the tone is considered not present, as indicated at block 210.

It will be appreciated that the step 206 can be implemented in different ways and at different points in the method. For example, following step 202, if the result of the energy analysis does not meet the criterion, then the process can be stopped (with a result of tone not present) and without determining the center frequency. If the criterion is met, then the process could move onto step 204 following which only the center frequency check need be made. Therefore, various different implementations of the method using both a spectral energy-based analysis and center frequency analysis can be used.

With reference now to FIG. 3, a more specific example of a tone detection method will be described. For this particular exemplary embodiment 300, the energy analysis compares the energy computed in two regions. One is around 2225 Hz that contains frequencies from 2255 Hz to 2400 Hz. This is referred to as the key frequency region. The other region consists of two sub regions that are neighbors to the key frequency region. One sub region is the lower side neighbor from 1500 Hz to 1800 Hz; and the other one is the upper side neighbor from 3000 Hz to 3300 Hz. When compared to voice signals and other audio such as music, the 2225 Hz tone signal contains much higher energy in the key frequency region than in the neighbor frequency region. The center frequency portion of the tone detection process helps prevent false positive detections of other types of audio, such as whistling, and this center frequency criterion can be implemented by estimating the amount of frequency shift in the key frequency region; that is, by estimating the center frequency of the signal and then determining whether that center frequency is shifted too far from the 2225 Hz tone to be considered the tone.

First, a pair of frequency sets $F_{key}$ and $F_{nb}$ are provided, step 302. $F_{key}$ is the key frequency set that contains the frequencies around 2225 Hz, and $F_{nb}$ is the neighbor frequency set that contains frequencies around the key frequency set. As one example, the two frequency sets can each include ten frequencies selected as follows:

$F_{key}$={2225,2300,2350,2245,2250,2255,2260,2265, 2700,2400}

$F_{nb}${1500,1550,1600,1700,1800,3000,3050,3100, 3200,3300}

These frequency sets can be predefined and the frequencies used can be selected in various ways, such as through empirical testing of the method. As shown above, the key frequencies include the primary frequency of the tone being detected, 2225 Hz, although this is not necessary. Also, in the example frequency sets given above, the discrete frequencies contained in the set $F_{key}$ of key frequencies are all within a range of 2,000 to 3,000 Hz, and the discrete frequencies of the neighboring set $F_{nb}$ include frequencies under 2,000 Hz and frequencies over 3,000 Hz. Again, where a different frequency tone is being detected or where a different vocoder is being used, a different selection of frequencies than are listed here may be desirable.

Then, to begin processing the signal received from the vocoder, a portion of the signal is obtained. For the CDMA cellular network of FIG. 1, the signal can be processed in 20 msec data frames which, for a sampling frequency of 8000 Hz, results in 160 samples per frame. The method 300 operates on a group of these data frames which can be represented by the set $X=\{x_1, x_2, \ldots, x_m\}$, where $x_k$ represents the $k^{th}$ data frame. Thus, at step 304, a first data frame $x_1$ is obtained. Then, the next step 306 is to compute an energy characteristic of the data frame for each of the discrete frequencies in the two frequency sets $F_{key}$ and $F_{nb}$. This can be done in the manner shown in FIG. 3 in which, at step 308, the energies are computed for each frequency in the $F_{key}$ frequency set, yielding results $e_{key}(1), e_{key}(2), \ldots, e_{key}(10)$. From this, a combined energy value $E_{key}$ can be computed using the equation:

$$E_{key} = \sum_{i=1}^{10} e_{key}(i).$$

As shown at 312 and 314 in FIG. 3, the same process can be used for the second frequency set $F_{nb}$, resulting in $e_{nb}(1)$, $e_{nb}(2), \ldots, e_{nb}(10)$ which can be combined to compute an energy value $E_{nb}$ according to the equation:

$$E_{nb} = \sum_{i=1}^{10} e_{nb}(i).$$

The energy of each frequency is equal to the square of its magnitude and can be determined using the Goertzel algorithm which is known to those skilled in the art.

Once the energy values $E_{key}$ and $E_{nb}$ have been computed, a relationship between them can be determined at step 316; for example, by calculating an energy ratio (ER), denoted by ρ, using the equation:

$$\rho = \begin{cases} \dfrac{E_{key}}{E_{nb}}, & \text{if } E_{key} > 0.1 \\ 0.0 & \text{if } E_{key} \leq 0.1 \end{cases}$$

If desired, the energy ratio can be smoothed across two or more data frames, such as by using the equation:

$$r^k = \alpha * \rho + r^{k-1} * (1-\alpha)$$

where the parameter α is a weighting factor. It can be, for example, 0.5, and can vary in a range of, for example, 0.2 to 0.8.

Then, this energy ratio (smoothed or not) is compared to a threshold, as indicated at step 318. The threshold can be, for example, 350, and can be varied as desired or appropriate for a particular application of the method. In one embodiment, it can be a value between 200 and 500. If it is less than the threshold, then this indicates that there is not enough of the signal energy concentrated at the key frequencies and therefore, the method determines that the tone is not present, as indicated at step 330. If, on the other hand, the energy ratio does meet the threshold criterion, then the process moves to step 320 where a center frequency $f_c$ for the data frame is determined. This determination can be done based on the computed energies of the different discrete frequencies contained in the first frequency set using the equation:

$$f_c(k) = f_{key}(i) = \arg\max \{e_{key}(i)\}.$$

This estimate of the center frequency for the frame $x_k$ is the discrete frequency from the set $F_{key}$ of key frequencies that has the maximal energy. This step then concludes the processing of the individual frame, and the method then moves to step 322 where a check is made to determine if all of the data frames have been processed; that is, has the entire set of m consecutive frames in the set $X = \{x_1, x_2, \ldots, x_m\}$ been processed. Typical values of m can be, for example, 10 to 20. Thus, where twenty frames are used, the process would require that all 20 consecutive frames meet the energy ratio threshold requirement. In general, the use of a center frequency in the tone detection process can be based on an analysis of the individual center frequencies $f_c$ for each data frame or, as is done in step 324, by combining them into a single center frequency covering the group of sequential data frames. Thus, once the steps 304 through 320 have been carried out for all of the consecutive frames in the set X, the process moves to step 324 where a single center frequency $f_m$ for the entire set of frames is determined. This center frequency can be selected as that frequency from the set of center frequencies $f_c(1), f_c(2), \ldots, f_c(m)$ that occurs most often, and thus can be determined using the equation:

$$f_m = \text{mode}\{f_c(i), i=1,2,\ldots m\}.$$

Once this center frequency $f_m$ is determined, the process moves to block 326 where it is compared to a selected range to determine whether it is too far shifted from a primary frequency of the tone. This step can be implemented, for example, by requiring the center frequency $f_m$ to satisfy the following condition:

$$|f_m - 2225| \leq \text{max\_shift}$$

where the max_shift is a threshold that can be, for example, 0-50 Hz or, in another embodiment, no more than 30 Hz. Note that although this selected range is centered on the primary (and only) frequency of the 2225 Hz tone used in this example, that it is not necessary to do so. Rather, if desired, the center of the range can be offset from the primary frequency of the tone being detected.

If the center frequency is within the selected range, this then means that both (1) the energy ratio met the pre-established criterion for each of the consecutive data frames and (2) that the center frequency is close enough to the tone such that the process therefore determines that the tone is present, as indicated at step 328; otherwise, the process determines that it is not present, as indicated at step 330.

This above described method is carried out by the tone detector 36 and can be also used by the tone detector of modem 44 (with a different selection of frequencies suitable for detecting the 850 Hz tone) or a different tone detection method can be used for modem 44.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although the illustrated embodiment includes a vocoder that utilizes the EVRC-B codec, the tone detection techniques disclosed herein can be used with other vocoders such as a GSM vocoder that uses a GSM codec. As another example, although the illustrated embodiment utilizes a vehicle telematics unit as the terminal wireless device, it will be appreciated by those skilled in the art that the tone detection techniques disclosed herein can be used with other terminal devices, such as a mobile handset. All such other embodiments, changes, and modifications are intended to come within the scope of the appended claims.

As used in this specification and claims, the terms "for example," "for instance," "such as," and "like," and the verbs "comprising," "having," "including," "containing," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for detecting a tone in a signal received from a vocoder, comprising carrying out the following steps using a processor-based tone detector:

performing a spectral energy analysis on the signal;
   determining a center frequency for the signal; and
   determining that tone is present if a result of the spectral energy analysis meets at least one selected criterion and if the center frequency is within a selected range of frequencies that includes a primary frequency of the tone.

2. A method for detecting a tone in a signal received from a vocoder, comprising carrying out the following steps using a processor-based tone detector:

(a) carrying out the following steps (a1) through (a3) for each of plurality of different portions of the signal:

(a1) determining an energy characteristic of a portion of the signal at each of a first plurality of selected frequencies that together comprise a first group of frequencies;

(a2) determining an energy characteristic of the portion of the signal at each of a second plurality of selected frequencies that together comprise a second group of frequencies;

(a3) determining a relationship between a combination of the energy characteristics for the first group of frequencies and a combination of the energy characteristics for the second group of frequencies; and (b) determining a center frequency for the first group of frequencies; and (c) determining that the tone is present in the signal if the relationship meets at least one selected criterion and if the center frequency is within a selected range of frequencies that includes a primary frequency of the tone.

3. The method of claim 2, wherein the first group of frequencies includes the primary frequency of the tone.

4. The method of claim 2, wherein the primary frequency and the frequencies contained in the first group of frequencies are all within a range of 2,000 to 3,000 Hz and wherein the second group of frequencies includes frequencies under 2,000 Hz and frequencies over 3,000 Hz.

5. The method of claim 4, wherein the primary frequency is 2225 Hz and constitutes the only frequency of the tone.

6. The method of claim 2, wherein steps (a1) and (a2) further comprise determining the energy contained in the portion of the signal at each of the selected frequencies.

7. The method of claim 6, wherein the energy is determined using a Goertzel algorithm.

8. The method of claim 6, wherein step (a3) further comprises the steps of combining the determined energies of the first plurality of frequencies into a first energy value, combining the determined energies of the second plurality of frequencies into a second energy value, and determining an energy ratio using the first and second energy values.

9. The method of claim 8, further comprising the step of setting the energy ratio to zero if the first energy value is below a selected value.

10. The method of claim 8, further comprising the step of smoothing the energy ratio.

11. The method of claim 8, wherein step (c) further comprises determining that the tone is present if the energy ratio is above a pre-established threshold and if the center frequency is within the selected range of frequencies.

12. The method of claim 11, wherein step (b) further comprises determining the center frequency only if the energy ratio is above the pre-established threshold.

13. The method of claim 2, wherein step (b) further comprises determining a single center frequency associated with the plurality of different portions of the signal.

14. The method of claim 13, wherein step (b) further comprises determining the center frequency from an estimated center frequency of each of the different portions of the signal.

15. The method of claim 2, wherein step (b) further comprises determining the center frequency using the energy characteristics determined for the first group of frequencies.

16. The method of claim 2, wherein the different portions of the signal comprise sequential data frames.

17. The method of claim 2, further comprising, prior to step (a), the step of receiving the signal via a vocoder using an Enhanced Variable Rate Codec-B (EVRC-B) or Global System for Mobile Communications (GSM) codec.

18. A method for detecting a tone in a signal received from an Enhanced Variable Rate Codec-B (EVRC-B) or Global System for Mobile Communications (GSM) vocoder, comprising carrying out the following steps using a processor-based tone detector:

(a) providing a first frequency set containing a plurality of discrete frequencies located near the tone;

(b) providing a second frequency set containing a plurality of discrete frequencies, some of which are located below all the frequencies in the first frequency set and others of which are located above all the frequencies in the first frequency set;

(c) carrying out the following steps (c1) through (c3) for each of plurality of sequential data frames of the signal:

(c1) determining an energy value for the first frequency set;

(c2) determining an energy value for the second frequency set;

(c3) determining an energy ratio using the energy values for the first and second frequency sets;

(d) determining a center frequency for the sequential data frames; and (e) determining that the tone is present in the signal if the energy ratio meets at least one selected criterion and if the center frequency is within a selected range of frequencies that includes a primary frequency of the tone.

19. The method of claim 18, wherein the primary frequency and the frequencies contained in the first frequency set are all within a range of 2,000 to 3,000 Hz and wherein the second frequency set includes frequencies under 2,000 Hz and frequencies over 3,000 Hz.

20. The method of claim 19, wherein:

step (c1) further comprises determining a first energy value by determining the energy contained in the data frame at each of the discrete frequencies in the first frequency set using a Goertzel algorithm and then summing those determined energies together;

step (c2) further comprises determining a second energy value by determining the energy contained in the data frame at each of the discrete frequencies in the second frequency set using a Goertzel algorithm and then summing those determined energies together;

step (c3) further comprises determining the ratio of the first energy value to the second energy value;

step (d) further comprises determining a single center frequency for the plurality of sequential data frames; and step (e) further comprises determining that the tone is present in the signal if the energy ratio is above a pre-established threshold and if the center frequency is within a selected range of frequencies.

* * * * *